March 12, 1946. R. R. ROOT 2,396,533
DUSTING APPARATUS
Filed May 24, 1943 4 Sheets-Sheet 1
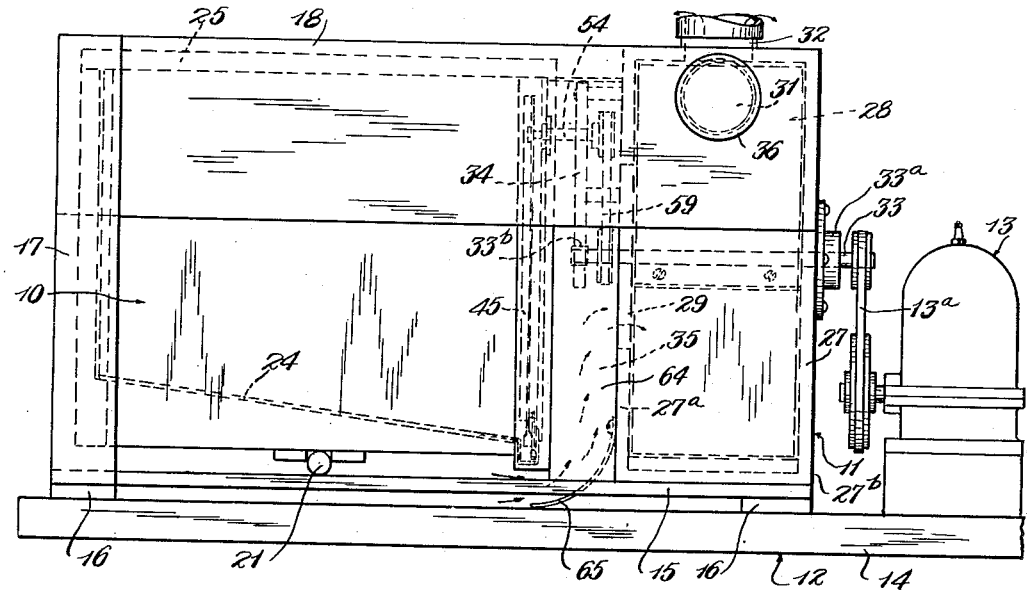
FIG. 1
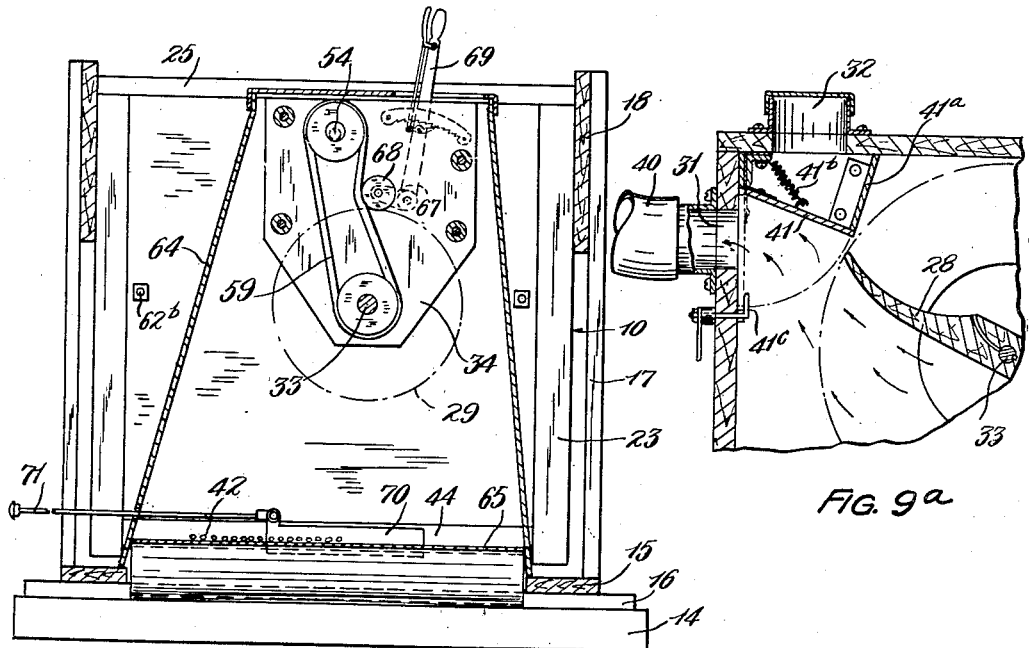
FIG. 3
FIG. 9a
INVENTOR.
BY RALPH R. ROOT
Kwis Hudson Boughton & Williams
ATTORNEYS March 12, 1946.                R. R. ROOT                2,396,533
                            DUSTING APPARATUS
                           Filed May 24, 1943           4 Sheets-Sheet 2
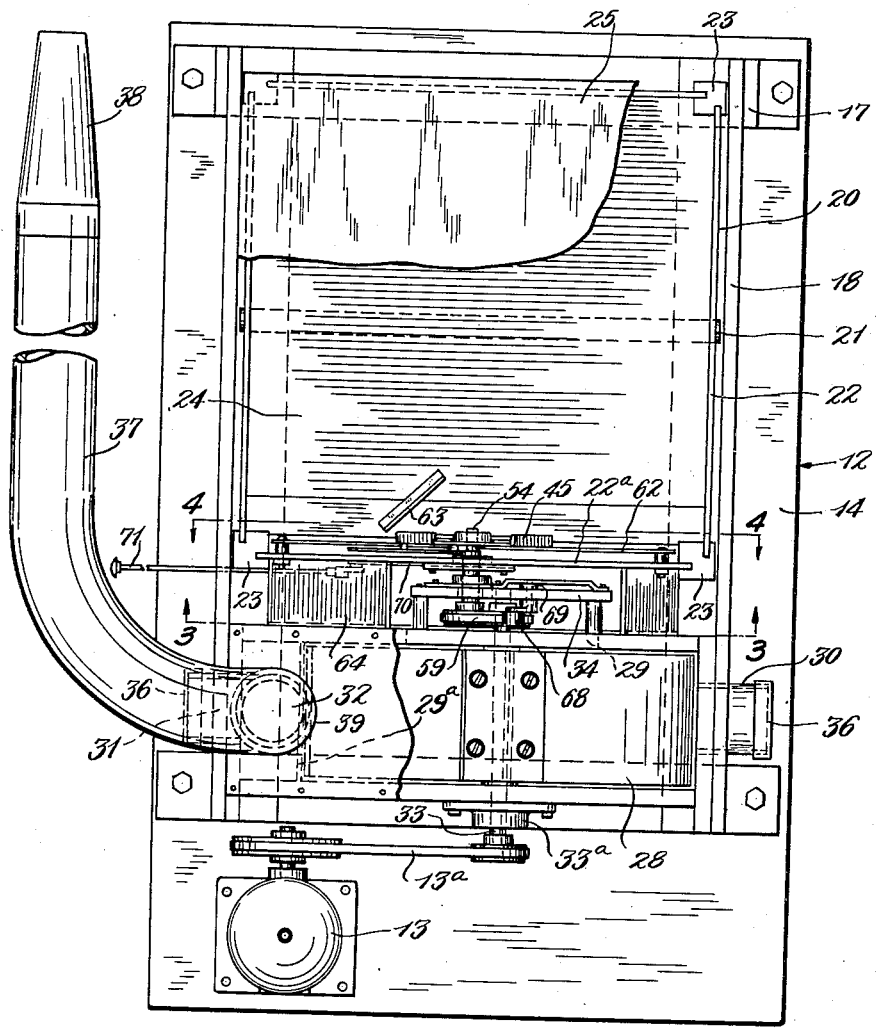
FIG. 2
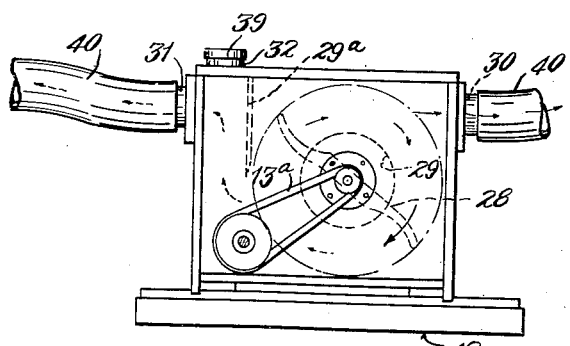
FIG. 9
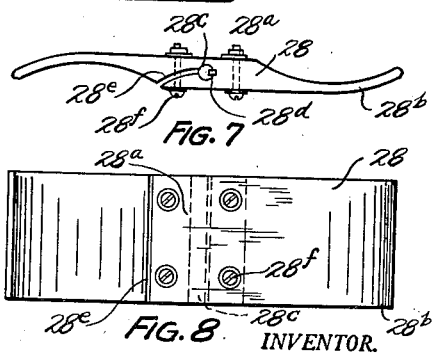
FIG. 7
FIG. 8
INVENTOR.
RALPH R. ROOT
BY
Kwis Hudson Boughton & Williams
ATTORNEYS March 12, 1946.   R. R. ROOT   2,396,533
DUSTING APPARATUS
Filed May 24, 1943   4 Sheets-Sheet 3
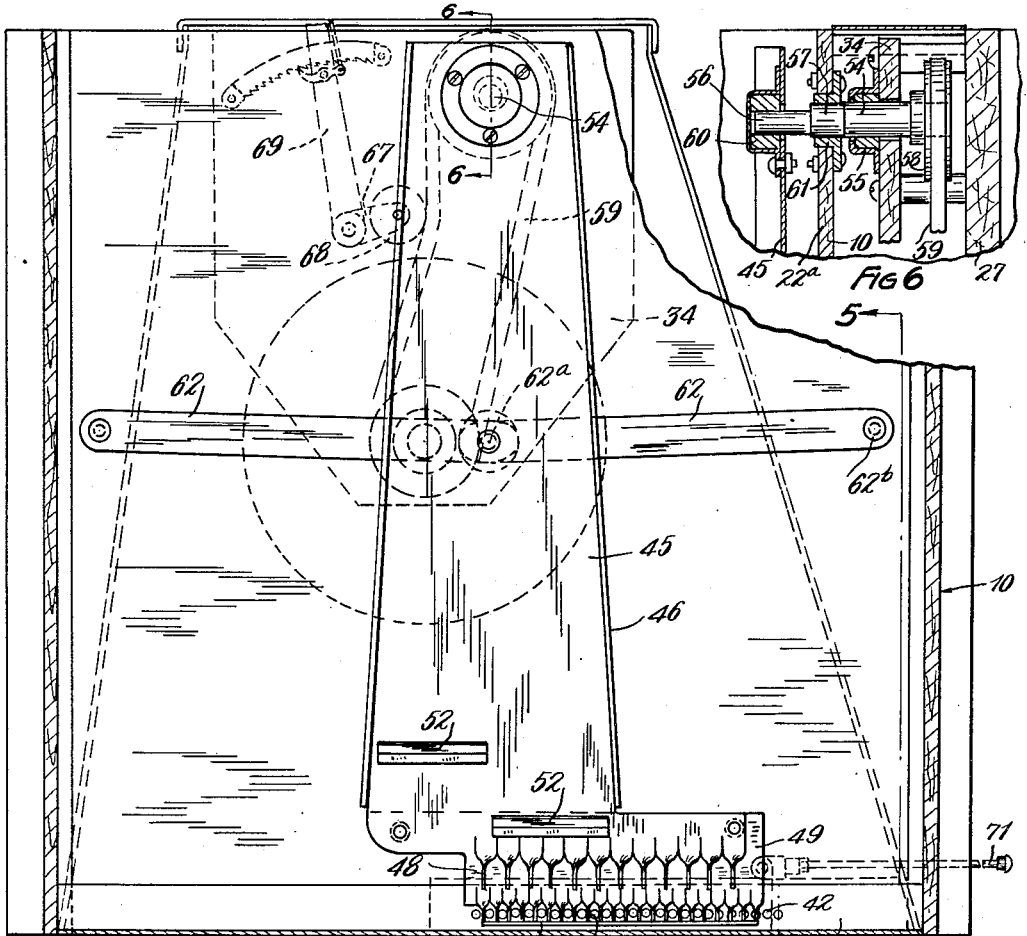
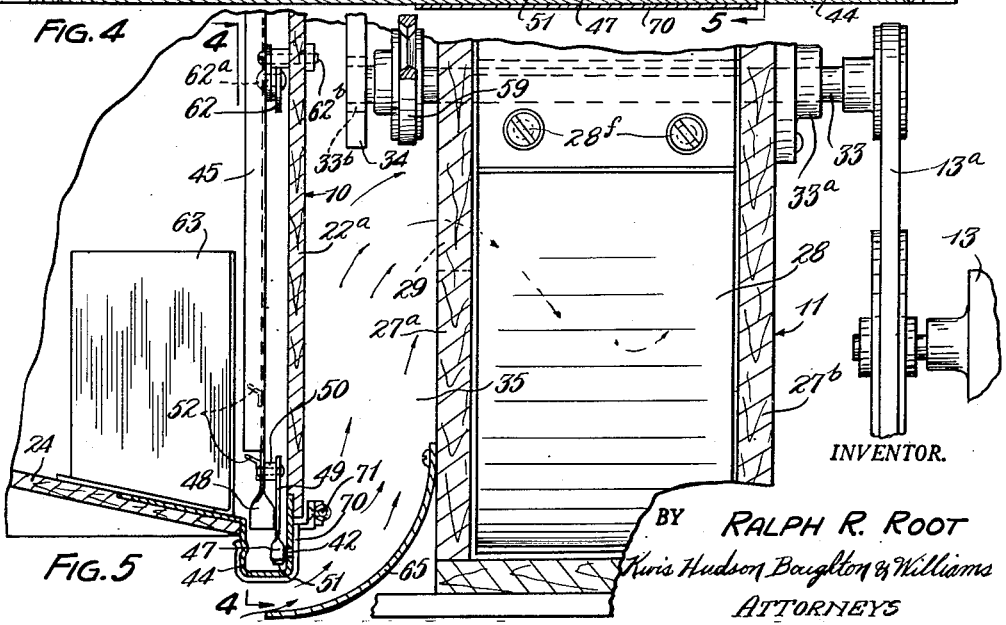
INVENTOR.
RALPH R. ROOT
BY Kuris Hudson Boughton & Williams
ATTORNEYS March 12, 1946.  R. R. ROOT  2,396,533
DUSTING APPARATUS
Filed May 24, 1943   4 Sheets-Sheet 4
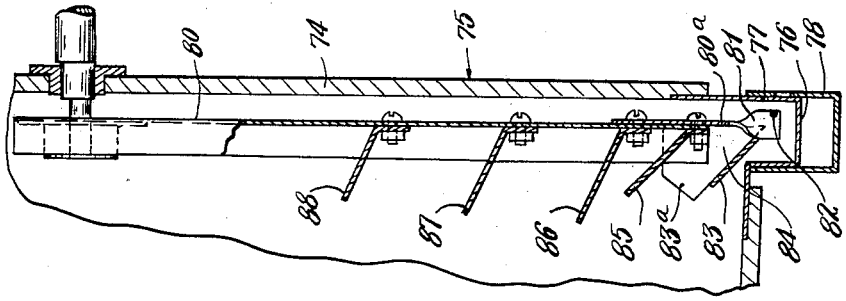
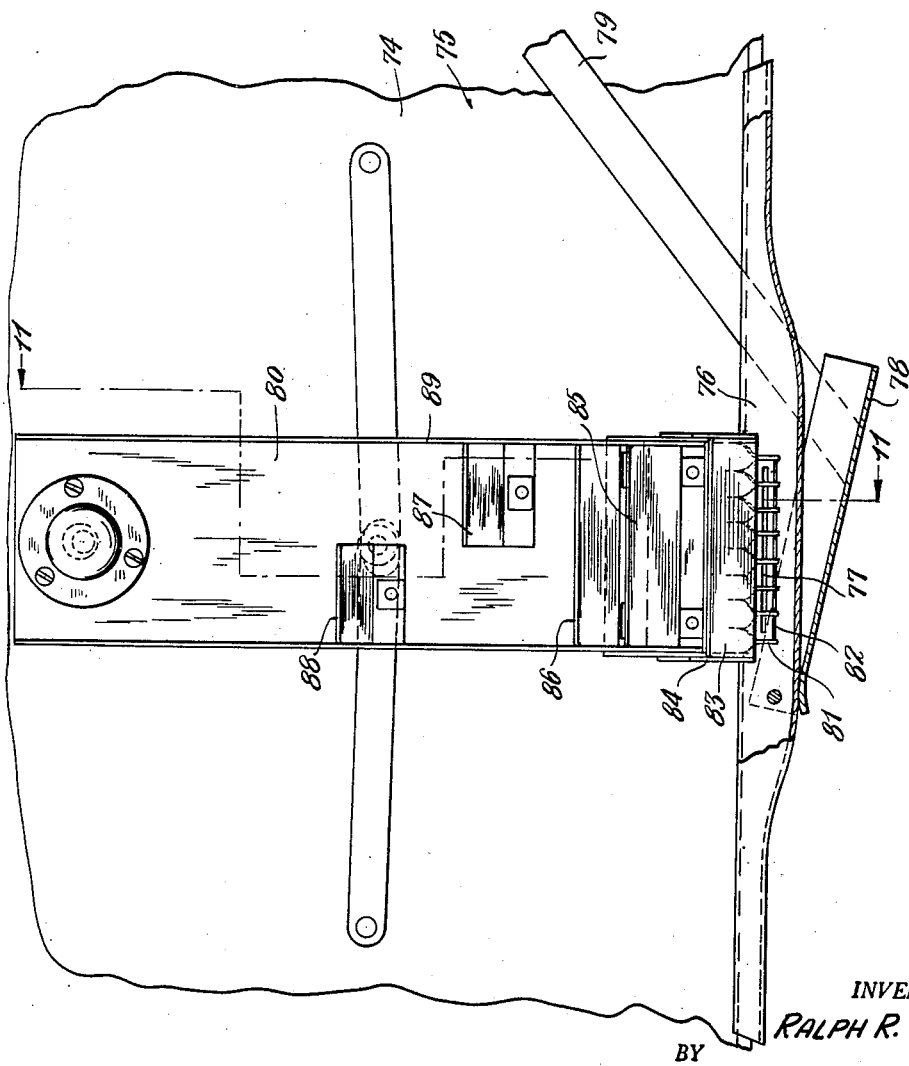
INVENTOR.
RALPH R. ROOT
BY
Kwis Hudson Boughton & Williams
ATTORNEYS Patented Mar. 12, 1946

2,396,533

UNITED STATES PATENT OFFICE 2,396,533

DUSTING APPARATUS

Ralph R. Root, Lakewood, Ohio, assignor to The Root Manufacturing Company, Cleveland, Ohio, a corporation of Ohio Application May 24, 1943, Serial No. 488,165

12 Claims. (Cl. 43—148)

This invention relates to an improved apparatus for dusting with insecticide and/or fungicide materials.

An object of the invention is to provide an improved dusting apparatus in which the feeding of dust from a container is accomplished in a more efficient and satisfactory manner than heretofore and in which an accurate and reliable control of the dust feed is obtainable.

Another object of this invention is to provide a novel apparatus of the character mentioned in which the feeding of dust through delivery openings of a dust container is obtained by agitating the dust adjacent such openings and simultaneously vibrating the container.

A further object of the invention is to provide a dusting apparatus of this character wherein a dust-laden air blast is produced in which the dust particles are electrostatically charged to make them more adherent to the vegetation being treated.

Other objects and advantages of the invention will be apparent from the following description when taken in conjunction with the accompanying sheets of drawings in which, Fig. 1 is a side elevation showing improved dusting apparatus of my invention;

Fig. 2 is a plan view thereof with portions of the apparatus broken away;

Fig. 3 is a transverse sectional view taken on line 3—3 of Fig. 2;

Fig. 4 is another transverse sectional view but on a larger scale and taken on line 4—4 of Fig. 2;

Fig. 5 is a partial longitudinal sectional view taken on line 5—5 of Fig. 4;

Fig. 6 is another partial longitudinal sectional view taken on line 6—6 of Fig. 4;

Fig. 7 is an edge view of the fan;

Fig. 8 is a face view thereof;

Fig. 9 is an end view of a modified form of my dusting apparatus;

Fig. 9a is a partial vertical sectional view taken through the blower housing of another modified form of my dusting apparatus;

Fig. 10 is a partial transverse sectional view similar to Fig. 4 but showing a modified construction; and Fig. 11 is a sectional view taken through the hopper and agitator as indicated by line 11—11 of Fig. 10.

Proceeding with a more detailed description of my improved dusting apparatus, I show in the drawings a dust container or hopper 10 adapted to hold a quantity of insecticide and/or fungicide dust, or like material, and an air-flow creating means or blower 11 adjacent such hopper. The apparatus also includes a frame or support 12 and an internal combustion engine 13, or other suitable power device, for operating the apparatus.

The support 12 may comprise a platform 14 on which the apparatus is mounted so as to enable the same to be conveniently moved or transported. The hopper 10 and the blower 11 are preferably not mounted directly on the platform 14 but are supported by a framework formed by spaced longitudinal and transverse strips 15 and 16 and a pair of spaced upright members 17. The upper ends of the members 17 are connected with the housing of the blower 11 by the longitudinal boards or rails 18. The blower 11 is bolted or otherwise secured to the platform 14 with the strips 15 and 16 therebetween. The hopper 10 is not fixed or secured to the platform 14 but is movably received within the opening 20 of the framework or crib formed by the members 17 and 18 and, for a purpose to be more fully explained hereinafter, is rockable on a transverse fulcrum or roller 21.

The hopper 10 comprises a box-like container having sides formed by four upright non-metallic boards or panels 22 which are connected by means of the corner posts 23. The bottom of the hopper is formed by a similar non-metallic board or panel 24 which slopes toward the hopper wall 22a which is nearest the blower 11. A suitable cover 25 is also provided to close the top opening of the hopper.

The blower 11 comprises a housing 27 and a centrifugal fan 28 operable therein. The housing 27 is a box-like structure formed of wood boards or other non-metallic sheet material and is provided with an air intake opening 29 located in the wall 27a and with suitably located delivery openings 30, 31 and 32 for the discharge of dust-laden air. A depending member 29a is located in the blower housing 27 so as to provide a cut-off point or baffle for the fan 28 which enables the latter to force air to the delivery openings 31 and 32. The fan 28 is carried by a shaft 33 which is journaled in bearings 33a and 33b carried, respectively, by the wall 27b of the blower housing and the plate or bracket 34 which is mounted on the wall 27a. The shaft 33 is driven from the power device 13 by the belt 13a.

As shown in the drawings, the blower housing 27 is mounted on the support 12 with a space 35 between the wall 27a of the blower housing and the wall 22a of the hopper 10. This space permits air or dust-laden air to flow upwardly between the hopper and blower housing and to be drawn into the blower housing through the opening 29. The dust-laden air is discharged by the centrifugal action of the fan 28 either through the delivery opening 32 as shown in Fig. 2 or through the delivery openings 30 and 31 as shown in Fig. 9. For certain types of dusting, such as in orchard work, it is desirable to use the delivery opening 32 in which case the openings 30 and 31 are closed by covers 36 and a delivery conduit 37 having a discharge nozzle 38 is connected to the opening 32. For certain other types of dusting, such as the treatment of ground crops, it is desirable to close the opening 32 by means of the cover 39 and to attach conduits 40 to the openings 30 and 31 for conducting the dust-laden air to suitably located delivery nozzles.

Another way of shifting from one delivery opening of the blower housing to another is illustrated in Fig. 3a in which I show a hinged plate or valve 41 normally held against the baffle or cut-off member 41a by the spring 41b. When the valve 41 is in this position the delivery opening 32 is closed and the opening 31 is open. When a shift is to be made from the delivery opening 31 to the opening 32, the operator reaches in through the opening 32 (while the delivery conduit is disconnected therefrom) and swings the valve 41 to its broken line position in which it closes the opening 31 and in which position it can be held by the rotatable latch 41c.

For feeding dust from the hopper 10 to the air stream created by the blower 11, I provide novel dust feeding means which operates in a highly satisfactory manner and which will be described next. This dust feeding means includes one or more dust delivery openings provided in a side or upright wall 22a of the hopper at a point adjacent the bottom thereof. In Figs. 3 and 4 I show the hopper 10 as having a row of such dust delivery openings 42 although the opening can be in the form of the slot 77 shown in Figs. 10 and 11. The openings 42 are relatively small openings, being in this instance on the order of 1/8 inch in diameter, although openings of larger or smaller size can be provided depending upon the characteristics of the dust being handled and the rate at which it is desired to feed the dust.

The dust delivery openings 42 can be formed directly in the wall 22a of the hopper but I prefer to provide the hopper with a depending trough 44 extending along the lower edge of the wall 22a and to locate the openings 42 in a side wall of this trough. The trough 44 may be formed of sheet metal or other suitable material and is incorporated in the hopper 10 so that it forms the lowest point thereof and will always be filled with dust so long as any appreciable quantity of dust remains in the hopper. The slope of the bottom 24 facilitates the movement of the dust toward the trough 44.

I have discovered that the feeding of the dust from the hopper through the openings 42 in a highly satisfactory manner can be obtained by producing a rapid vibratory relative movement between the hopper 10 and an agitator located therein. Although the feeding of the dust can be obtained by imparting vibratory movement to either the hopper or the agitator, I find that much better results can be secured by agitating the dust within the hopper adjacent the delivery openings 42 and simultaneously vibrating the hopper. For thus agitating the dust within the hopper, I provide an agitator 45 located adjacent the hopper wall 22a and adapted to be actuated or oscillated with a relatively rapid rotary or gyratory movement. The agitator 45 is best shown in Figs. 4 and 5 and comprises an elongated body formed of sheet metal or other suitable material and being of a length corresponding substantially with the depth of the hopper. Flanges 46 formed on the agitator at the sides thereof and extending away from the wall 22a serve to strengthen the agitator and also produce an agitating effect on the dust in the hopper. At its lower end the agitator is of a bladed construction, being provided in this instance with upper and lower sets or rows of depending blades 47 and 48 which are disposed at substantially right angles to the hopper wall 22a and are spaced apart longitudinally of the trough 44. The blades 47 and 48 extend down into the trough 44, as shown in Figs. 4 and 5, the blades preferably extending only part-way into the trough. The blades 47 are located at a lower point of the agitator than the blades 48 and are offset toward the hopper wall 22a, so that they extend along the row of openings 42 immediately in front thereof.

The blades 47 are formed by twisting or deflecting portions of the metal of a plate or strip 49 which is attached to the body of the agitator with spacers 50 therebetween. When the blades 47 are thus formed by deflecting or twisting portions of the member 49, spaces are left between the adjacent blades through which dust can readily pass to the openings 42. The lower ends of the blades 47 are connected or bridged by a longitudinal strip 51 which strengthens the blades and also produces an agitating effect on the dust. The blades 48 may be formed in a manner similar to the blades 47 but in this instance are shown as being somewhat larger and less numerous than the blades 47 and as being formed directly on, or integral with, the lower edge of the body of the agitator 45. Since the blades 48 extend only part-way into the trough 44 they serve to agitate the dust at this point and facilitate the flow of dust into the trough. The blades 48 can be omitted, if desired, in which case the blades 47 would be formed on the agitator body as shown in Figs. 10 and 11.

In addition to the sets of blades 47 and 48, the agitator 45 may also carry angularly disposed transverse flanges 52. In this instance two such flanges are shown on the agitator at different distances above the blades 48. The flanges 52 exercise an important agitating function on the dust during the rotary or gyratory movement of the agitator.

For oscillating the agitator 45 and vibrating the hopper 10 I provide a shaft 54 which is mounted in a suitable bearing 55 carried by the plate or bracket 34 attached to the blower housing 27. This shaft has eccentric actuating portions 56 and 57 which cooperate respectively with the agitator 45 and the hopper 10. The shaft 54 also carries a pulley 58 and is connected with an extension of the fan shaft 33 by the belt 59. The eccentric shaft portion 56 engages in a bearing 60 provided on the agitator adjacent its upper end and the eccentric portion 57 engages in a suitable bearing 61 provided in the wall 22a of the hopper.

When the blower 11 is operated the shaft 54 will be driven simultaneously and the eccentric shaft portions 56 and 57 will cause, respectively, a rapid oscillation of the agitator 45 and a rapid vibration or vibratory rocking of the hopper 10 on its fulcrum 21. These actions, or a combination thereof, result in dust being fed from the hopper 10 in streams which are forcibly projected or squirted laterally through the openings 42 into the space 35 where the discharged dust is picked up by the stream of air being drawn into the blower housing. The dust thus discharged from the hopper is carried along with the air stream and becomes thoroughly distributed or atomized by the action of the fan 28.

The agitator 45 is movably retained in its desired upright position by a pair of substantially oppositely extending links 62 having their adjacent ends connected with the agitator substantially mid-way of its height by a common pivot 62*a* and their outer or remote ends connected with the hopper wall 22*a* by the pivots 62*b*. The pivot 62*a* provides a floating fulcrum for the agitator.

In my novel dusting apparatus the movement of the agitator 45 in the hopper causes the dust therein to be loosened and aerated, particularly that portion of the dust which is adjacent and above the trough 44 and the delivery openings 42. More or less of a circulating movement or flow is also imparted to the dust in the hopper by the agitation and vibration so that the dust is continuously maintained in a loose and unpacked condition. The rapid movement of the bladed portion of the agitator adjacent the delivery openings 42 causes the aerated dust to be forcibly projected through these openings in lateral streams as mentioned above. The circulatory movement or flow of the dust in the hopper 10 is substantially a counter-clockwise movement and to prevent such movement from packing the dust against the inner surface of the agitator 45, I may provide a stationary upright baffle plate 63 in the hopper inwardly of the trough 44, as shown in Figs. 2 and 5, and which is attached to the hopper bottom 24.

To confine and direct the inflow of air to the blower 11 so that it will flow upwardly as a stream into the space 35 between the blower housing and hopper, I provide a hood 64 which houses or encloses the shaft 54 and belt 59 but is open at the lower end thereof. The upward flow of air into this hood is facilitated by a curved plate or deflector 65 which extends between the blower housing and the platform 14 and causes the inflowing air to sweep upwardly in front of the dust delivery openings 42.

The feeding of the dust from the hopper 10 through the openings 42 can be readily controlled by starting and stopping the movement of the agitator 45 and the vibration of the hopper. In other words the blower 11 can be operated continuously and the dust can be fed to the air stream intermittently by starting and stopping the movement of the agitator and the vibration of the hopper. This can be readily accomplished by controlling the delivery of power by the belt 59 to the shaft 54. One way of obtaining such control is by providing a belt tightener 67 having an idler 68 engageable with the belt and a lever 69 adapted to be manually swung for shifting the idler to loosen or slacken the belt. When the feeding of dust is desired, the lever is actuated to tighten the belt and when the feeding of dust is to be interrupted the lever is actuated to slacken the belt. Since the dust delivery openings 42 are relatively small and are located in a side wall of the hopper, no dust will flow therefrom when the agitator 45 is at rest and the hopper is not being vibrated.

In addition to controlling the feeding of dust by the belt tightening device, it may be desirable to also provide a cover or valve plate 70 which is slidable on the trough 44 and is adapted to be moved by the manually operable rod 71 for uncovering a desired number of the holes 42.

An important feature of my invention is the charging of the dust particles with electricity and through which certain new and improved results are obtained. The charging of the dust particles with electricity causes them to be attracted to, and to adhere to, the plants or vegetation being treated. This is very important because many of the dust particles which would otherwise settle to the ground are brought into contact with the vegetation and adhere thereto. Likewise many particles which would otherwise readily drop from the vegetation after striking the same will, when electrically charged, adhere to such vegetation. Another important result derived from the charging of the dust particles with electricity is that the particles in the dust-laden air stream repel each other and a better diffusion and distribution of the dust particles throughout the air stream is obtained.

For the purpose of electrically charging the dust particles, I construct the blower housing 27 of wood or other non-metallic material, as above explained, and also construct the fan 28 of wood or other non-metallic material. The rapid movement of the fan in the blower housing and the resulting beating or agitation of the air stream and dust particles results in the particles being electrically or electrostatically charged. Since there are very few metallic parts embodied in the blower 11 and there are no metallic parts providing a continuous ground connection leading from the blower, it will be seen that the electrical charge imparted to the dust particles will be retained thereby to produce the above described beneficial effect.

It will be noted from Figs. 7 and 8 that the fan 28 is of a novel construction and one which I have found to operate very efficiently and satisfactorily in the blower housing 27. The fan 28, as mentioned above, is formed of wood or other non-metallic material and comprises a one-piece body having a hub portion 28*a* and blades 28*b* extending in opposite directions from the hub portion. The blades 28*b* are bent or curved so that their outer ends or tips are inclined forwardly in the direction of fan rotation. As shown in Fig. 8, the fan 28 is of substantially the same width from one blade tip to the other. This fan can be sawed or otherwise cut from a slab of wood or other suitable material and, as shown in Fig. 7, the opposite faces of the hub portion 28*a* may be substantially flat parallel faces which are substantially tangent to the curved backs of the blades 28*b*. The hub portion has a shaft receiving opening 28*c* and a key 28*d* by which the fan can be mounted on the shaft 33. A transverse slit or cut 28*e* in the hub portion 28*a* permits expansion of the opening 28*c* for mounting the fan on the shaft after which the clamping bolts 28*f* can be tightened for retaining the fan on the shaft.

In Figs. 10 and 11 I show a modified construction for the dust containing hopper and the agitator therein. In this modified construction the wall 74 of the dust-containing hopper 75 is provided with a trough 76 along the lower edge thereof, as previously described, but instead of the trough being provided with a series of dust delivery openings as in Fig. 4, I provide the trough with a laterally extending slot 77 which, in this instance, is approximately $\frac{1}{16}$ inch wide. The width and length of this slot can be varied according to the rate of feed desired and the characteristics of the dust being used. More or less of the slot 77 can be uncovered by swinging a control valve or plate 78 downwardly by an actuating handle 79 connected therewith.

The agitator 80 located in the hopper just inwardly of the wall 74 comprises an elongated member generally similar to the agitator 45 but having only one row of spaced depending blades 81 at its lower end. The blades 81 extend into the trough 76 so as to be movable back and forth in front of the slot 77. The blades 81 can be formed directly on the body of the agitator or, as in this instance, can be formed on a strip 80a which is suitably attached to the agitator body. The lower ends of the blades are connected together by means of a wire or bar 82. A plate 83 having end walls or flanges 83a is connected with the body of the agitator so as to form therewith a downwardly converging passage 84 through which dust can pass to the spaces between the blades 81. At spaced points along the agitator corresponding with different distances above the trough 76 I provide the agitator with inwardly and upwardly inclined transverse flanges 85, 86, 87 and 88. The flanges 85 and 86 extend for the full width of the agitator 80 but the flanges 87 and 88 extend for only approximately one-half of the width thereof. The agitator 80 may be of substantially uniform width, as shown in Fig. 10, and may have inwardly extending flanges 89 along its side edges.

The agitator 80 is actuated in the same manner as the above described agitator 45, and, during such actuation, the above-described various portions of the agitator cause aeration and loosening of the dust in the hopper 75. This agitation of the dust by the agitator 80 in combination with the vibration of the hopper, causes a thin flat stream or ribbon of dust to be forcibly discharged or squirted laterally through the slot 77.

In my novel dusting apparatus I have observed that the lateral discharge of the dust stream or streams from the hopper opening or openings takes place at a substantially constant rate in response to the actuation of the agitator and the vibration of the hopper and such rate of discharge is substantially independent of the head or quantity of dust contained in the hopper. This is very desirable because it insures a proper supply of dust to the air stream at all times during the operation of the apparatus. It will be seen also that the actuation of the agitator in the hopper serves to break up whatever lumps there may be in the dust and because of the relatively small width of the dust delivery openings or slot, lumps of dust cannot be discharged into the air stream but must remain in the hopper to be broken up by the agitator.

The non-metallic construction for the blower housing and fan provide for the charging of the dust particles electrostatically for better adherence, as above explained, but is important for the additional reason that it is safer to operate particularly with sulphur-containing materials which are likely to be ignited when used in metallic dusters unless care is observed to see that such metallic dusters are satisfactorily grounded. In my improved duster the total area of the feed opening or openings is only about one sixtieth of the area heretofore needed in dusters for the feed opening. The accurate and sensitive control afforded by my novel feeding means permits dust to be distributed efficiently even though the rate varies from one pound per acre to about seventy-five pounds per acre. This accurate control makes practical and economical the use of more highly concentrated dusting material which is very desirable in the present day treatment of vegetation.

While I have illustrated and described my improved dusting apparatus in considerable detail it will be understood, of course, that I do not wish to be limited to the particular details herein disclosed but regard my invention as including all changes and modifications coming within the scope of the appended claims.

Having thus described my invention, I claim:

1. In apparatus of the character described, a hopper adapted to contain dust and having a substantially horizontally extending row of relatively small dust-delivery openings in a side wall thereof and adjacent the hopper bottom, agitating means in the hopper adapted to be moved rapidly across said openings, means for imparting movement to said agitating means, and means for simultaneously vibrating the hopper, said agitating means and vibrating means acting to cause substantially continuous streams of dust to be projected laterally from said openings.

2. In apparatus of the character described, a hopper adapted to contain dust and having one or more dust-delivery openings in a side wall thereof, an agitator in the hopper adjacent said openings, a floating fulcrum for said agitator, and oscillating means connected with the agitator and cooperating with said fulcrum for imparting to said agitator a combined swinging and rising and falling movement.

3. In apparatus of the character described, a hopper adapted to contain dust and having one or more dust-delivery openings in a side wall thereof, an agitator in the hopper adjacent said openings, a floating fulcrum for said agitator, oscillating means connected with the agitator and cooperating with said fulcrum for imparting to said agitator a combined swinging and rising and falling movement, and means for simultaneously vibrating said hopper.

4. In apparatus of the character described, a hopper adapted to contain dust and having one or more dust-delivery openings in a side wall thereof, means for agitating the dust in the hopper to produce a flow through said openings, said agitating means comprising a member having a series of substantially flat blades adjacent said openings and extending at substantially right angles to said wall, and means for oscillating said member for moving said blades across said openings.

5. In dusting apparatus, a hopper adapted to contain dust and having a plurality of dust-delivery openings adjacent the bottom thereof and extending through a side wall, means supporting said hopper for vibratory movement, an agitator fulcrumed in the hopper and having a bladed portion adjacent said openings, means for oscillating said agitator to cause movement of its bladed portion across said openings, and means for simultaneously vibrating said hopper.

6. In dusting apparatus, a hopper adapted to contain dust and having a plurality of dust-delivery openings adjacent the bottom thereof and extending through a side wall, an agitator having a bladed portion adjacent said openings, said agitator also having upright and transverse flanges thereon, a floating fulcrum for said agitator, and oscillating means connected with the agitator and cooperating with said fulcrum for imparting to said agitator a combined swinging and rising and falling movement for causing agitation of the dust in the hopper by said bladed portion and flanges.

7. In dusting apparatus, a hopper adapted to contain dust, a trough at the bottom of the hopper, said trough having dust delivery openings through a side wall thereof, an agitator in the hopper and having a series of substantially flat depending blades extending into said trough adjacent said openings, and means for oscillating said agitator to cause movement of said blades in said trough.

8. In dusting apparatus, a hopper adapted to contain dust and having a plurality of dust-delivery openings adjacent the bottom thereof and extending through a side wall, an agitator having a bladed portion adjacent said openings, and a rotary shaft having eccentric means adapted to oscillate said agitator and vibrate said hopper.

9. In dusting apparatus, a blower housing made of a material which does not conduct electricity and having inlet and delivery openings, a fan made of a material which does not conduct electricity and operable in said housing to cause a stream of air to flow through said openings, and a hopper adapted to contain dust and to feed the same to the air stream entering said housing, said fan acting to impart an electrostatic charge to the dust particles.

10. In dusting apparatus, a blower housing made of a material which does not conduct electricity and having inlet and delivery openings, a fan made of a material which does not conduct electricity and operable in said housing to cause a stream of air to flow through said openings, said fan having a non-metallic one-piece body comprising a hub and two blades extending in opposite directions therefrom and said fan being of substantially the same width from one blade tip to the other blade tip and said blades being curved forwardly in the direction of fan rotation, a hopper adapted to contain dust and having relatively small dust-delivery openings in a side wall thereof at a point to project streams of dust into the air stream entering said blower housing, agitating means in the hopper adjacent said openings, means for actuating said agitating means, and means for vibrating said hopper, said fan acting to impart an electrostatic charge to the dust particles.

11. In dusting apparatus, a container adapted to contain dust and having one or more dust-delivery openings adjacent the bottom thereof and extending through a side wall, means supporting said container for vibratory movement, an agitator in the container and having a bladed portion adjacent said openings, means mounting said agitator for oscillation for movement of its bladed portion transversely to said openings, and a driven shaft connected with said container and agitator for vibrating the former and oscillating the latter.

12. In dusting apparatus, a hopper adapted to contain dust and having one or more dust delivery openings adjacent the bottom thereof and extending through a side wall, a blower having a housing, said housing having an air inlet opening located above said delivery openings and said housing being spaced laterally from said hopper to provide therebetween an air passage extending upwardly across said delivery openings to said inlet opening, means supporting said hopper for vibratory movement, an agitator movable in said hopper adjacent said delivery openings, means for driving said blower to produce a flow of air through said air passage, and a driven shaft having connections with said hopper and agitator for simultaneously vibrating the former and oscillating the latter, the vibration of said hopper and the oscillation of said agitator acting to cause substantially continuous streams of dust to be projected laterally from said openings into said air passage.

RALPH R. ROOT.